(No Model.) 4 Sheets—Sheet 1.

G. EASTMAN & F. M. COSSITT.
DETECTIVE CAMERA.

No. 353,545. Patented Nov. 30, 1886.

Witnesses
H. G. Phillips.
John E. Sharpe

Inventors
Geo. Eastman,
F. M. Cossitt.
By their Attorney
Geo. B. Selden

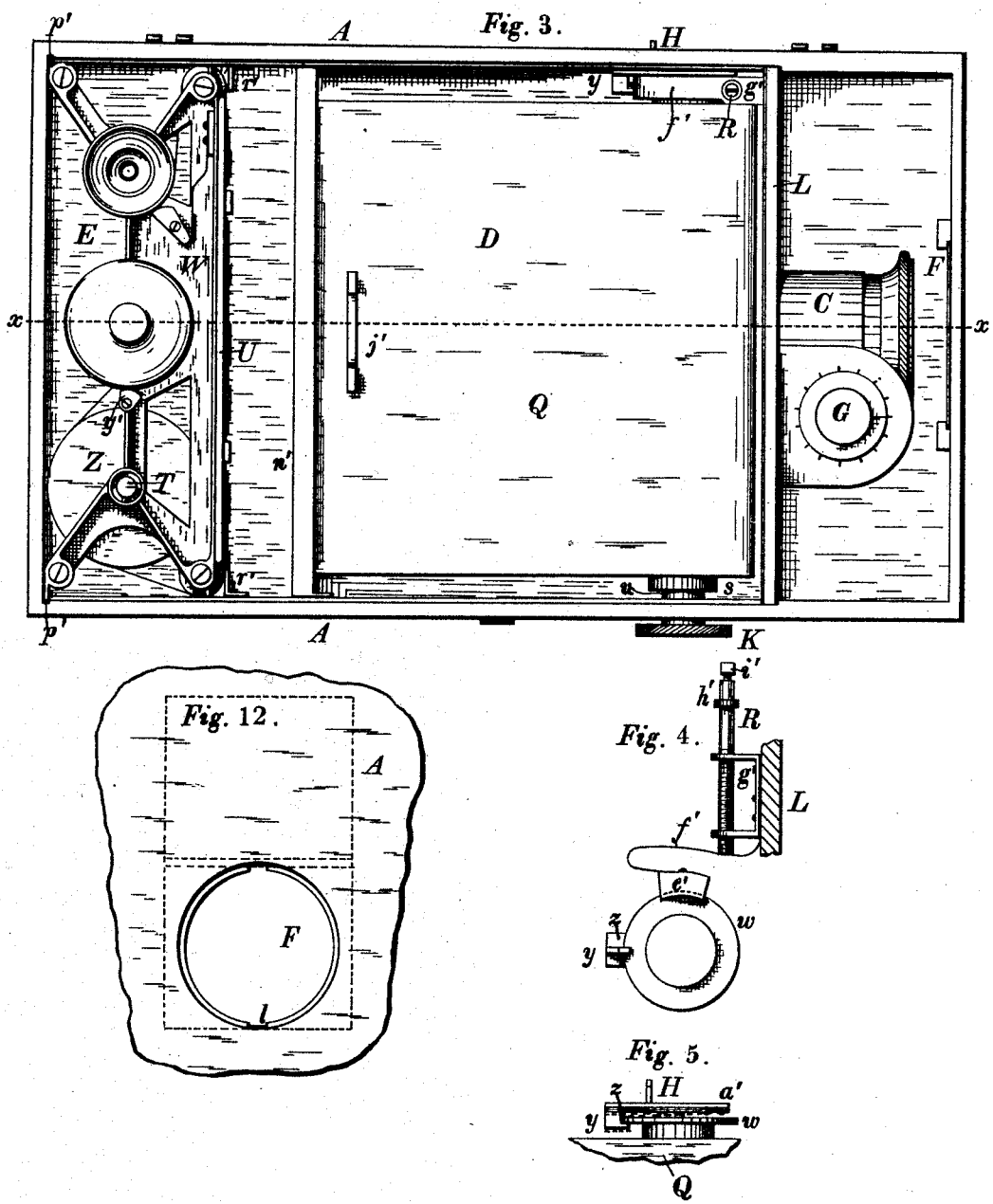

(No Model.) 4 Sheets—Sheet 3.

G. EASTMAN & F. M. COSSITT.
DETECTIVE CAMERA.

No. 353,545. Patented Nov. 30, 1886.

Witnesses
H. G. Phillips.
John E. Sharpe.

Inventors
Geo. Eastman,
F. M. Cossitt
By Their Attorney
Geo. B. Selden (No Model.) 4 Sheets—Sheet 4.
G. EASTMAN & F. M. COSSITT.
DETECTIVE CAMERA.
No. 353,545. Patented Nov. 30, 1886.
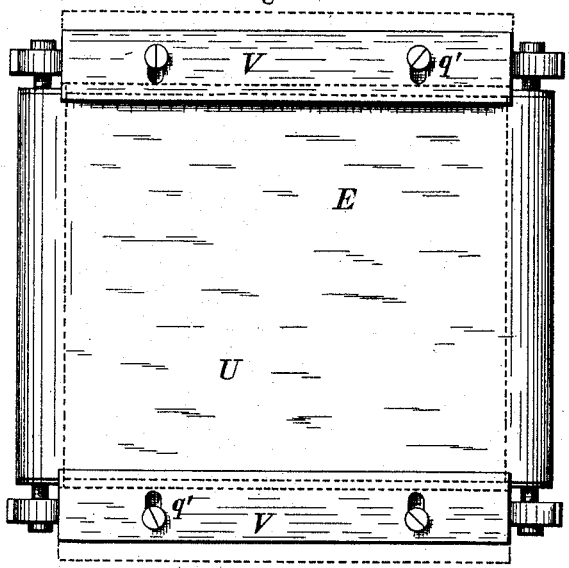
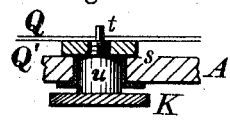
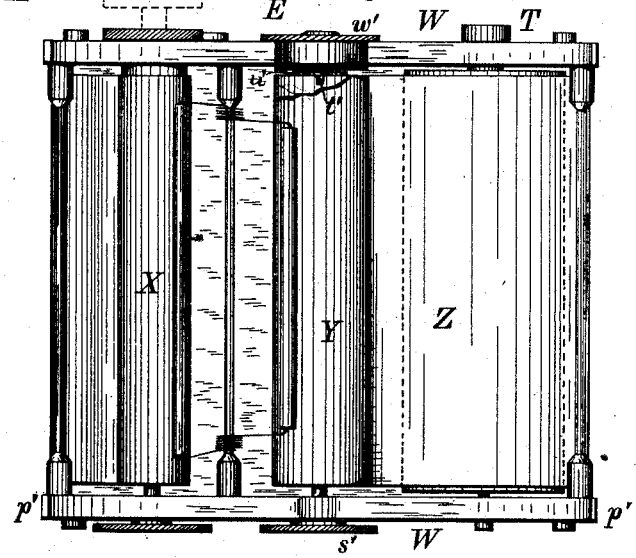
Witnesses
H. G. Phillips.
John E. Sharpe.
Inventors
Geo. Eastman
F. M. Cossitt
By their Attorney
Geo. B. Selden.

UNITED STATES PATENT OFFICE.

GEORGE EASTMAN AND FRANKLIN M. COSSITT, OF ROCHESTER, NEW YORK, ASSIGNORS TO THE EASTMAN DRY PLATE AND FILM COMPANY, OF SAME PLACE.

DETECTIVE-CAMERA.

SPECIFICATION forming part of Letters Patent No. 353,545, dated November 30, 1886.

Application filed March 1, 1886. Serial No. 193,603. (No model.)

*To all whom it may concern:*

Be it known that we, GEORGE EASTMAN and FRANKLIN M. COSSITT, citizens of the United States, residing at Rochester, in the State of New York, have jointly invented an Improved Detective-Camera, of which the following is a specification, reference being had to the accompanying drawings.

Our invention relates to certain improvements in detective-cameras of that type or class which are provided with roll-holders adapted to the support of a strip of suitable sensitized paper or film while successive exposures are made thereon, which improvements are fully described and illustrated in the following specification and accompanying drawings, and the novel features thereof specified in the claims annexed to the said specification.

Our improved detective-camera is represented in the accompanying drawings, in which—

Figure 1:
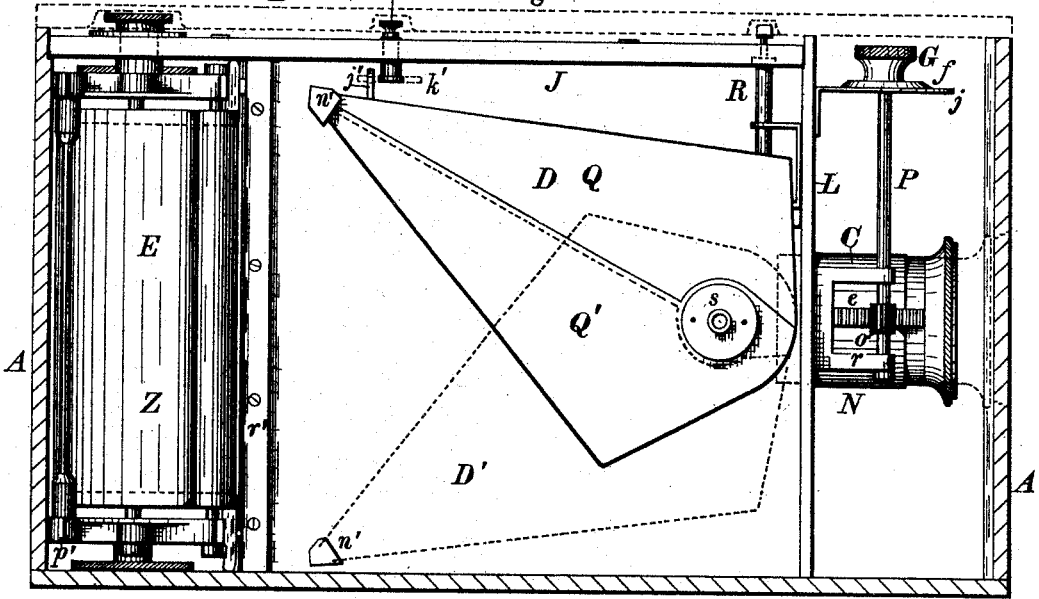
Figure 2:
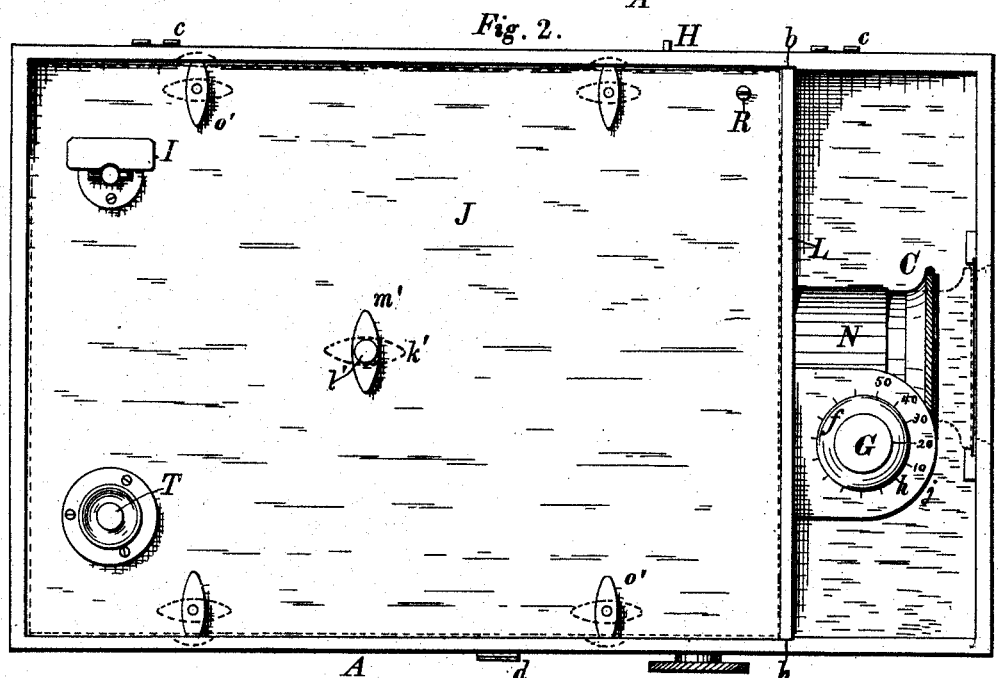
Figure 6:
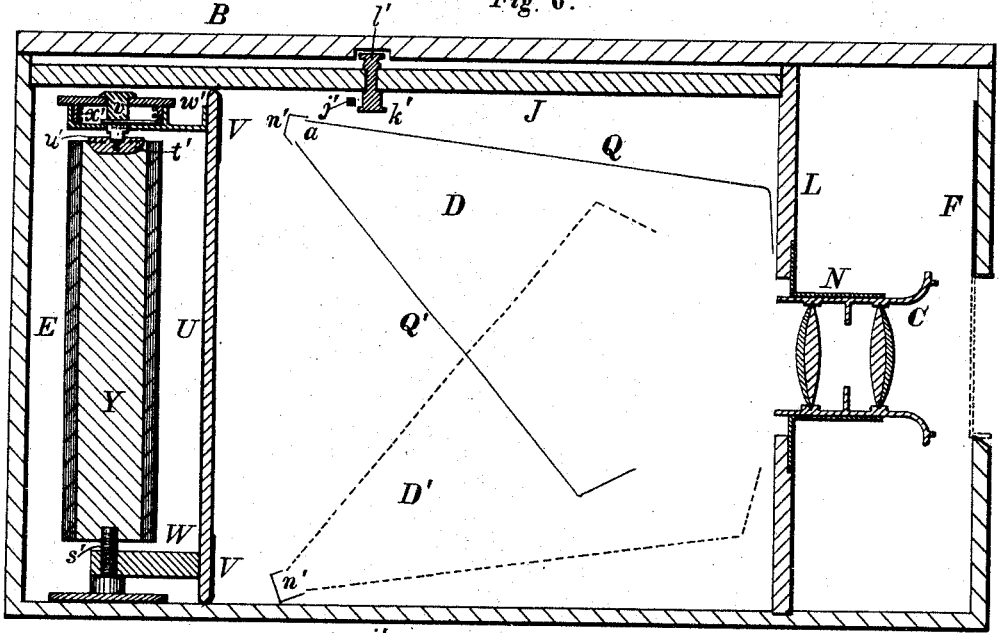
Figure 7:
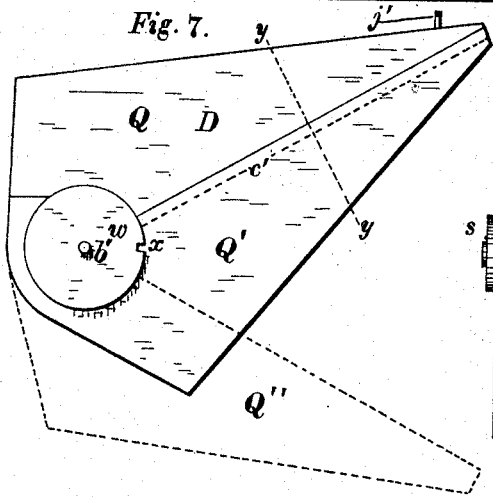
Figure 8:
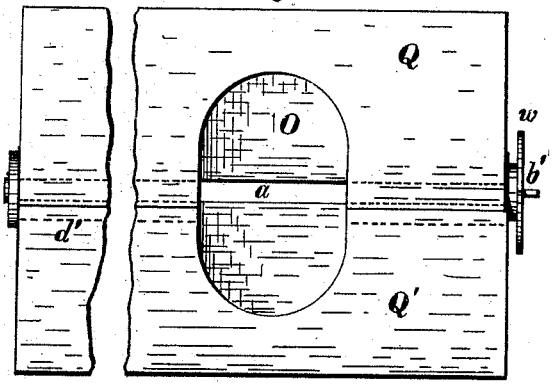
Figure 9:
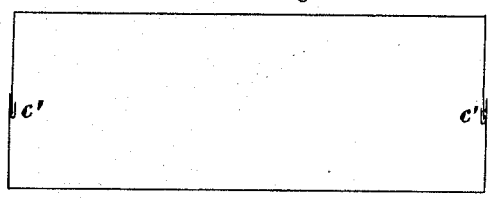
Figure 10:
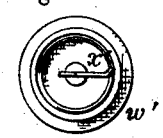

Figure 1 is an elevation, the side of the inclosing case next the observer being removed. Fig. 2 is a plan view, the lid of the inclosing-case being removed. Fig. 3 is a plan view, the inner lid or cover being removed. Fig. 4 is an elevation representing the friction device for regulating the time of the exposure. Fig. 5 is a plan view of the drop or catch by which the exposure is effected. Fig. 6 is a central longitudinal section on the line $x\,x$, Fig. 3. Fig. 7 is a side elevation representing the drop-shutter device detached. Fig. 8 is an end elevation of the same, as seen from the front or lens end of the camera. Fig. 9 is a transverse section of the same on the line $y\,y$, Fig. 7. Fig. 10 represents the tension-spring and barrel detached, as seen from the inside. Fig. 11 is a front view of the roll-holder. Fig. 12 is a view of a portion of the front of the case, showing the exposing-shutter. Fig. 13 is a rear elevation of the roll-holder. Fig. 14 represents the thumb-nut by which the drop-shutter is returned to place after an exposure.

A A in the accompanying drawings represents the case of our improved detective-camera, which is provided on the top or on one side with a removable or hinged lid or cover, B, Fig. 1; C, the lens; D, the drop-shutter; and E, the roll-holder, which carries the requisite supply of flexible sensitized photographic paper or film.

As represented in Figs. 3 and 12, the front end of the case is provided with an opening through which light is admitted to the lens C, which opening is closed when the apparatus is not in use by means of the sliding exposing-shutter F. Provision is made for adjusting the focus of the lens by means of the thumb-nut G. The drop-shutter is operated or permitted to drop from the position indicated by the full lines in Figs. 1 and 6 to that represented by the dotted lines in the said figures by the pressure of the finger on the spring-catch H, arranged on one side of the box. In making the exposure the light from the lens passes through the narrow slit or opening $a$, Figs. 6 and 8, in the rear end of the pivoted drop-shutter, which as it falls exposes the sensitized surface to the image on the lens in sections one after another, thereby insuring the greatest sharpness in the details of the picture. The roll-holder is of a type substantially similar to that shown in prior patents, Nos. 317,049 and 317,050, dated May 5, 1885, certain modifications being introduced in order to adapt it to the particular use in question. The film or paper is shifted between exposures by means of the thumb-nut or key I, Fig. 2, arranged to act directly on the reel of the roll-holder. Below the removable or hinged lid B is placed a secondary detachable cover, J, which excludes the light from the apparatus when the outer lid is open. The lid B is preferably attached to the edge of one side of the case by the hinges indicated at $c\,c$, Fig. 2, and the hook or spring-catch $d$ on the opposite side.

K, Figs. 2 and 3, is a thumb-nut projecting outward from one side of the case, which is used to return the drop-shutter from the position indicated at D′ to D, Figs. 1 and 6, and which is also applied for the purpose of separating the two sections constituting the drop-shutter, as indicated in Fig. 7, when it is desired for any reason to give a long exposure.

The central space of the camera, occupied by the drop-shutter, is separated from the chamber at its front, which incloses the lens by a division wall or plate, L, to which the lens and its focusing apparatus are attached.

Referring more particularly to the details of the construction, it will be observed that the plate L is fitted into grooves b in the opposite sides of the camera, so that it may be readily removed therefrom. The lens C is arranged to slide backward and forward for the purpose of focal adjustment in a tube, N, attached to the front side of the plate L by a flange. On one side the tube N is provided with a slot through which the rack e, Fig. 1, attached to the lens-mount, projects. A pinion, o, on the rod P meshes with the rack e. At its upper end the rod P is provided with a thumb-nut, G, and a circular flange, f, provided with a radial mark, which, in order to focus the image, is turned to correspond with some one of the index-marks h which indicate the position at which the lens should be set in order to focus objects at different distances from the camera. The circular index-plate h is engraved on or otherwise applied to the upper surface of a projecting bracket, j, attached to the front of the plate L. This arrangement dispenses with the necessity of a focusing-screen or other arrangement for insuring the obtainment of a sharp image on the sensitized surface, as the operator by opening the lid B can turn the thumb-nut G until the mark on the plate f corresponds with some one of the index-marks h, and thus adjust the focus for an object located at any distance from the camera. After this operation of focusing is accomplished the operator effects the exposure by sliding an exposing-shutter, F, upward by means of a projection, l, Fig. 12, thereby permitting the access of light to the lens and then causing the shutter D to drop by pressure on the catch H. The lower end of the rod P is supported by a bracket, r, attached to the plate L.

Passing now to a description of the mode of operation of the drop-shutter, it will be observed from an inspection of the drawings that the drop-shutter consists of the upper and lower sections, Q Q', which are preferably formed of sheet metal and provided at the forward end with an opening or orifice, O, Fig. 8, through which the light of the lens passes, and at the rear end with the slit a, through which the light is permitted to act on the sensitized surface. The shutter is provided on one side with the boss s, Figs. 1, 3, and 8, attached to the lower section, Q', and into which the screw K is firmly screwed. Outside the boss s the screw K is provided with the cylindrical portion u, Figs. 3 and 14, arranged to turn freely in a suitable collar or socket inserted in the side of the case of the camera. A suitable collar is interposed between the boss s and the inside of the casing. The boss s is attached to the lower section, Q, being pivoted on the inner end or point, t, of the screw K, as indicated in Fig. 14. On the opposite side the lower section, Q', of the drop-shutter is provided with a disk, w, Figs. 4, 5, 7, and 8, set off from the side of the section a short distance by a suitable collar, and provided on its edge with a notch, x, in which the catch y, Figs. 4 and 5, engages. The catch y is attached to the spring z, arranged to be pushed inward by the push-pin H, by which the exposure is effected. The spring z is attached to the side of the case or to a suitable plate, a', Fig. 5, secured thereto. When the shutter is in the position indicated by the full lines D in Figs. 1 and 6, on pushing the pin H inward the catch y is disengaged from the notch x in the edge of the disk w, and the pivoted shutter is permitted to fall by its weight to the position indicated by the dotted lines D' in the two said figures, thereby effecting the exposure. The catch y reaches inward to engage with the notch x, a suitable recess being formed between the inner part of the catch and the spring z to permit the disk to turn therein. Previous to the next exposure the drop-shutter is returned from the position D' to the position indicated at D by turning the thumb-nut K.

The operation of the spring-catch will be understood from an examination of Fig. 4, which represents the disk w as seen from the inside or next to the shutter. A pin, b', Figs. 7 and 8, projecting beyond the disk, enters an opening in the side of the casing, so that the shutter is pivoted on both sides and is permitted to fall by its own weight. As indicated in the sectional view, Fig. 9, the edge of one of the sections of the shutter is made double, as shown at c' c', the edge of the other shutter being arranged to enter the groove thus formed for the purpose of preventing the escape of light from the interior of the shutter.

In order to regulate the rapidity with which the shutter falls when the push-pin H is pressed inward, we apply to the edge of the disk w a brake, e', Fig. 4. This brake is provided with a groove, which fits over the edge of the disk w, and it is constantly pressed against the disk by means of the spring f', Figs. 3 and 4. Provision is made for adjusting the tension of the spring f', and consequently the amount of friction between it and the edge of the disk, thereby controlling the speed with which the drop-shutter falls and the time of exposure by means of the screw R, arranged to be screwed up and down in a bracket, g', attached to the division wall or plate L. At its upper end the screw R passes through the detachable cover J, being provided near its upper end with a flange or collar, h', which prevents the entrance of light at this point when the lid B is open. The collar h' fits a recessed or counterbored hole in the lower side of the cover. At its upper extremity the screw is flattened or provided with an indicator, i', the position of which serves to show the operator the amount of friction between the brake e' and the edge of the disk w.

We attach to the upper section, Q, the loop or catch j', Figs. 1, 2, 3, and 6, with which a movable catch or hook, $k'$, engages when it occupies the position represented by the dotted lines in Fig. 2, so that the upper section, Q, of the drop-shutter will be held in place, as indicated by the full lines in Fig. 7, while the lower section, $Q'$, is turned downward by the thumb-nut K into the position $Q^2$, thereby permitting the exposure of the whole plate for any desired length of time, as in an ordinary camera. In order to effect this result it is necessary to turn the knob $l'$, Figs. 1 and 2, so as to engage the catch $k'$ with the loop $j'$, and then to turn the thumb nut K so as to swing the lower section, $Q'$, of the drop-shutter downward, as indicated in Fig. 7, the catch $y$ being previously detached from its engagement with the notch in the edge of the disk $w$ by pressure on the push-pin H. The thumb-nut $l'$ passes through the removable secondary cover J, and is attached to the catch or hook $k'$ below the cover, the pointer or indicator $m'$, Fig. 2, being attached to the nut $l'$ above the cover, so as to indicate the position of the catch $k'$ below.

Extending across the camera at the rear end of the drop shutter, and both above and below, are placed the light-excluding guards $n'$, Figs. 1, 3, and 6. These guards are preferably made of sheet metal, being attached to the sides of the camera at each end, and they serve to exclude the access of light to the sensitized surface when the sliding shutter F, at the front end of the camera, is open. As indicated in Fig. 6, the inner edges of the guards $n'\ n'$ are arranged as close as possible to the rear end of the drop shutter without preventing the free movement of the latter. The secondary cover J is provided with any suitable catches, $o'$, Fig. 2, by which it may be detachably secured to the casing of the camera. The edges of the cover are fitted into a suitable rabbet in the casing in order to exclude the light.

Proceeding now to a description of the roll-holder, which supports the sensitized film or paper in our improved detective-camera, it is shown in front elevation in Fig. 11 and in rear elevation in Fig. 13. It consists, essentially, of the side frames, W W, the paper or film support U, the reel X, and spool Y, a measuring-roll, Z, being also employed by preference. The roll-holder is arranged to be slid in and out of the case, being preferably provided with lugs $p'$ on the frames, adapted to fit in suitable grooves in the interior of the case. Suitable guides, $r'\ r'$, attached to the inside of the case, may also be employed, these guides serving also to cut off the light at each end of the support U. The spool Y is constructed so that it may be removed from the holder when required, being provided at one end with the thumb-screw $s'$ and at the other with a transverse slot, in which the rib or lug $t'$, Figs. 6 and 13, on the collar $u'$ of the spring-barrel $w'$, fits. The collar $u'$ is attached to a pin, $v'$, which passes through the spring-barrel $w'$, and is connected with a spring, $x'$, Figs. 6 and 10, by the friction of which against the interior of the barrel a constant tension or strain is maintained on the paper or film, while at the same time the spool is permitted to revolve when the reel is turned for the purpose of shifting the paper so as to bring an unexposed portion in front of the support. The spring-barrel is prevented from revolving by a pawl, $y'$, Fig. 3, engaging with teeth on the edge of a projecting flange on the spring-barrel. The spring $x'$ is formed of a number of coils of wire compressed within the cylinder of the spring-barrel and bearing against its inner surface with a frictional contact. The inner end of the spring is inserted in a hole or slot in the pin, so that the spring is caused to revolve within the barrel when the spool turns.

We claim—

1. The pivoted drop-shutter D, provided with opening O at the front end and slot $a$ at the rear end, substantially as described.

2. The combination, with the pivoted drop-shutter D, having opening O and slot $a$, of the notched disk $w$ and catch $y$, substantially as described.

3. The combination, with the pivoted drop-shutter D, having opening O and slot $a$, of a suitable stop or catch arranged to permit the fall of the free end of the shutter for the purpose of effecting the exposure, substantially as described.

4. The pivoted drop-shutter D, consisting of a suitable light-tight casing having an opening, O, at its largest end and a slot, $a$, at its narrower end, and arranged to effect the exposure by the passage of light through the slot when the free end of the shutter falls, substantially as described.

5. The pivoted drop-shutter D, consisting of the upper and lower separable sections, $Q\ Q'$, substantially as described.

6. The pivoted drop-shutter D, consisting of the upper and lower separable sections, $Q\ Q'$, provided with grooves $c'$ on their opposing edges, substantially as described.

7. The combination, with the pivoted drop-shutter D, having opening O and slot $a$, of the catch $y$ and thumb-nut K, substantially as described.

8. The combination, with the pivoted drop-shutter D, provided with opening O and slot $a$, of a suitable brake arranged to control the time of exposure, substantially as described.

9. The combination, with the drop shutter D, of the disk $w$, brake $e'$, spring $f'$, and adjusting-screw R, substantially as described.

10. The combination, with the case A, having lid B and inner cover, J, of the pivoted drop-shutter D and adjustable means for controlling the time of exposure, so located as to be accessible when lid B is open, substantially as described.

11. The combination, with the case A, having lid B and inner cover, J, of the pivoted drop-shutter D and adjustable means for controlling the time of exposure, provided with an indicator so located as to be accessible when lid B is open, substantially as described.

12. The combination, with the drop shutter D, composed of two separable sections, Q Q', of a locking device by which the upper section may be prevented from falling, substantially as described.

13. The combination, with the drop shutter D, composed of two separable sections, Q Q', of the loop j' and catch k', substantially as described.

14. The combination, with the drop shutter D, composed of two separable sections, Q Q', of a locking-catch arranged to retain the upper section in position, and a thumb-nut, K, attached to the lower section, substantially as described.

15. The combination, with the case A, having lid B and inner cover, J, of the pivoted drop-shutter D, composed of the separable sections Q Q', a locking-catch arranged to retain the upper section in position, and a thumb-nut, K, attached to the lower section, substantially as described.

16. The combination of the case A, having exposing-shutter F, lens C, plate L, drop-shutter D, roll-holder E, and inner removable light-tight cover J, substantially as described.

17. The combination, with the case A, of the roll-holder E, drop-shutter D, and lens C, attached to the removable plate L, substantially as described.

18. The combination, with the lens C and roll-holder E, of the pivoted drop-shutter D, provided with opening O and slot a, substantially as described.

19. The combination, with the drop-shutter D, having opening O and slot a, of the light-excluding guards n', substantially as described.

20. The combination, with the drop-shutter D, having opening O and slot a, of the light-excluding guards n', and a suitable catch for permitting the shutter to drop to effect the exposure, substantially as described.

21. The combination, with the lens C and roll-holder E, of the drop-shutter D, having opening O and slot a, the light-excluding guards n', and a suitable catch for releasing the shutter to effect the exposure, substantially as described.

22. The combination, with the lens and drop-shutter, of the roll-holder E, provided with lugs p', and case A, having suitable grooves for the reception of the lugs, substantially as described.

23. The combination, with the case A, having lid B and inner cover, J, of the roll-holder E, drop shutter D, and lens C, and means for adjusting the focal position of the lens, substantially as described.

24. The combination, with the case A, having lid B and inner cover, J, of the lens C, drop-shutter D, and roll-holder E, having winding-key I, and indicator T, substantially as described.

25. The combination, with the reel and spool of a roll-holder, of the supporting-plate U, having sliding paper-guides V attached to its edges, substantially as described.

26. In a camera such as described, and in combination with the lens and plate or film holder thereof, a tubular shutter or light-conveyer interposed between the lens and holder and provided with a narrow slit or opening at the end adjacent the holder and an enlarged opening next the lens, said shutter or conveyer being manipulated in a manner to effect a gradual and uniform movement of the slitted end across the face of the plate or film, substantially as and for the purpose set forth.

27. In a camera such as described, and in combination with the lens and plate or film holder thereof, a tubular shutter interposed between the lens and holder, the walls of said shutter converging toward the holder and terminating in a narrow slot or opening next the latter, and means for effecting the passage of the slotted end of the shutter across and in proximity to the sensitized film, substantially as described.

28. In combination with the lens and plate or film holder of a camera such as described, an interposed shutter pivotally supported near the end adjacent to the lens, and with its opposite end in proximity to the sensitized film in the holder, said shutter being provided with a longitudinal opening or passage terminating in a transverse slot near the sensitized film, substantially as and for the purpose set forth.

29. In a camera such as described, and in combination with plate or film holder thereof, a tubular shutter provided with a narrow slot or opening adjacent to the holder and pivotally supported at or near one end in such manner that when vibrated its slotted end will be caused to move across and in proximity to the sensitized film, substantially as described.

30. In a camera such as described, and in combination with the plate or film holder, a tubular shutter pivotally supported near one end and provided with a narrow slot or opening next the film-holder, substantially as described.

31. In a camera such as described, and in combination with the film or plate holder thereof, a tubular drop-shutter pivotally supported at one end and provided with a narrow slot or opening at the end remote from the pivot and adjacent to the plate or film holder, said tubular shutter being divided longitudinally, substantially as and for the purpose set forth.

32. In a camera such as described, and in combination with the plate or film holder, the lens and the inclosing-case, a tubular shutter interposed between the lens and holder and pivotally supported at the end nearest the lens, while the opposite end is free to move across and in proximity to the sensitized film in the holder, substantially as described.

33. In a camera such as described, and in combination with the lens and film or plate holder, a swinging tubular shutter composed of two sections supported upon coincident axes, substantially as described.

34. In a camera such as described, and in combination with the lens and plate or film holder, a pivoted tubular shutter arranged to swing in the arc of a circle across the face of the holder, and light-excluding guards cooperating with the free end of the shutter to close the opening or slot therein at the extremes of its movement, substantially as described.

35. In a camera such as described, the combination, with the lens and holder, of a tubular shutter supported upon transverse pivots in rear of the lens and with its free end contiguous to the holder, and means for vibrating said shutter upon its pivoted supports to cause its free end to move across the face of the holder, substantially as described.

36. In a camera such as described, and in combination with the lens and plate or film holder thereof, a tubular shutter interposed between the lens and holder and pivotally supported and vibrating in the arc of a circle in rear of the lens with its free end contiguous to the holder, substantially as described.

GEO. EASTMAN.
FRANKLIN M. COSSITT.

Witnesses:
GEO. B. SELDEN,
H. G. PHILLIPS.